United States Patent [19]

Gross et al.

[11] 4,035,284
[45] July 12, 1977

[54] METHOD AND SYSTEM FOR REGENERATING FLUIDIZABLE CATALYST PARTICLES

[75] Inventors: Benjamin Gross, Cherry Hill; Hartley Owen, Belle Mead, both of N.J.

[73] Assignee: Mobil Oil Corporation, New York, N.Y.

[21] Appl. No.: 380,173

[22] Filed: July 18, 1973

[51] Int. Cl.$^2$ .................. C10G 11/04; B01J 8/24
[52] U.S. Cl. .................. 208/120; 23/288 S; 208/113; 208/164; 252/417; 252/419
[58] Field of Search .......... 208/120, 113; 252/417, 252/419

[56] References Cited

U.S. PATENT DOCUMENTS

| | | | |
|---|---|---|---|
| 2,389,236 | 11/1945 | Payne | 208/153 |
| 2,526,881 | 10/1950 | Kunreuther et al. | 208/95 |
| 2,902,432 | 9/1959 | Codet et al. | 208/113 |
| 3,351,548 | 11/1967 | Payne | 208/120 |
| 3,494,858 | 2/1970 | Luckenbach | 208/164 |
| 3,563,911 | 2/1971 | Pfeiffer et al. | 252/417 |
| 3,844,973 | 10/1974 | Stine et al. | 252/417 |
| 3,886,060 | 5/1975 | Owen | 208/120 |
| 3,893,812 | 7/1975 | Conner et al. | 23/288 B |
| 3,909,392 | 9/1975 | Horecky et al. | 208/120 |
| 3,926,778 | 12/1975 | Owen et al. | 208/74 |

FOREIGN PATENT DOCUMENTS 2,162,110  7/1973  France ................. 208/120

Primary Examiner—Delbert E. Gantz
Assistant Examiner—G. E. Schmitkons
Attorney, Agent, or Firm—Charles A. Huggett; Carl D. Farnsworth

[57] ABSTRACT

A hydrocarbon conversion-catalyst regeneration operation is described which relies upon a dense fluid catalyst bed superimposed by a dispersed catalyst phase operation to effect elevated temperature regeneration of the catalyst providing low CO levels less than 0.15 mol percent in the flue gas by mixing regenerated catalyst with spent catalyst to obtain an initial mix temperature of at least 1175° F. before contact with oxygen containing regeneration gas. The ratio of regenerated to spent catalyst is restricted to within the range of 0.5 to 1.5 and the oxygen content through the dense and dispersed catalyst phase is selected to provide a discharged dispersed catalyst phase temperature of at least 1350° F.

8 Claims, 2 Drawing Figures

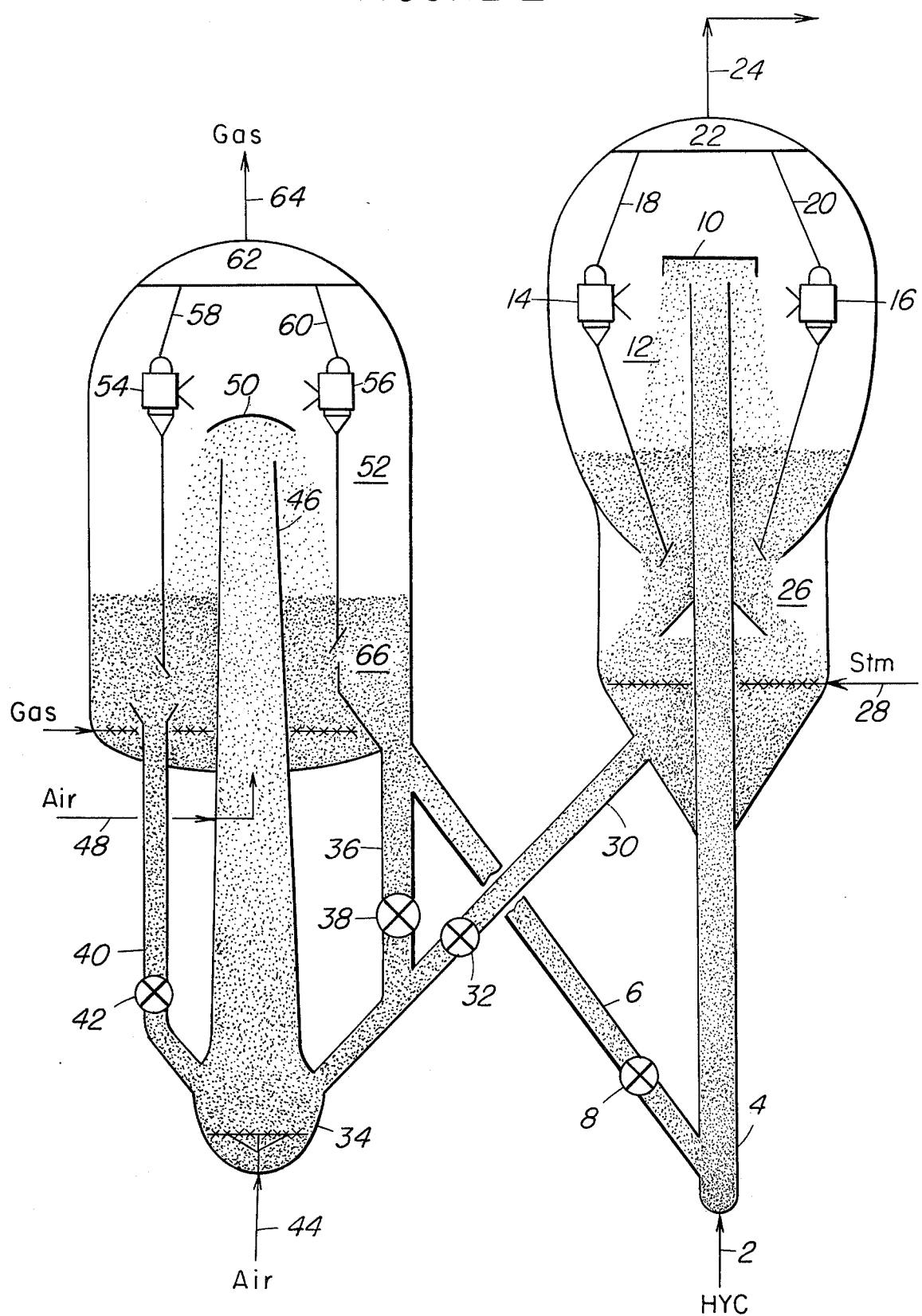
FIGURE I

FIGURE II
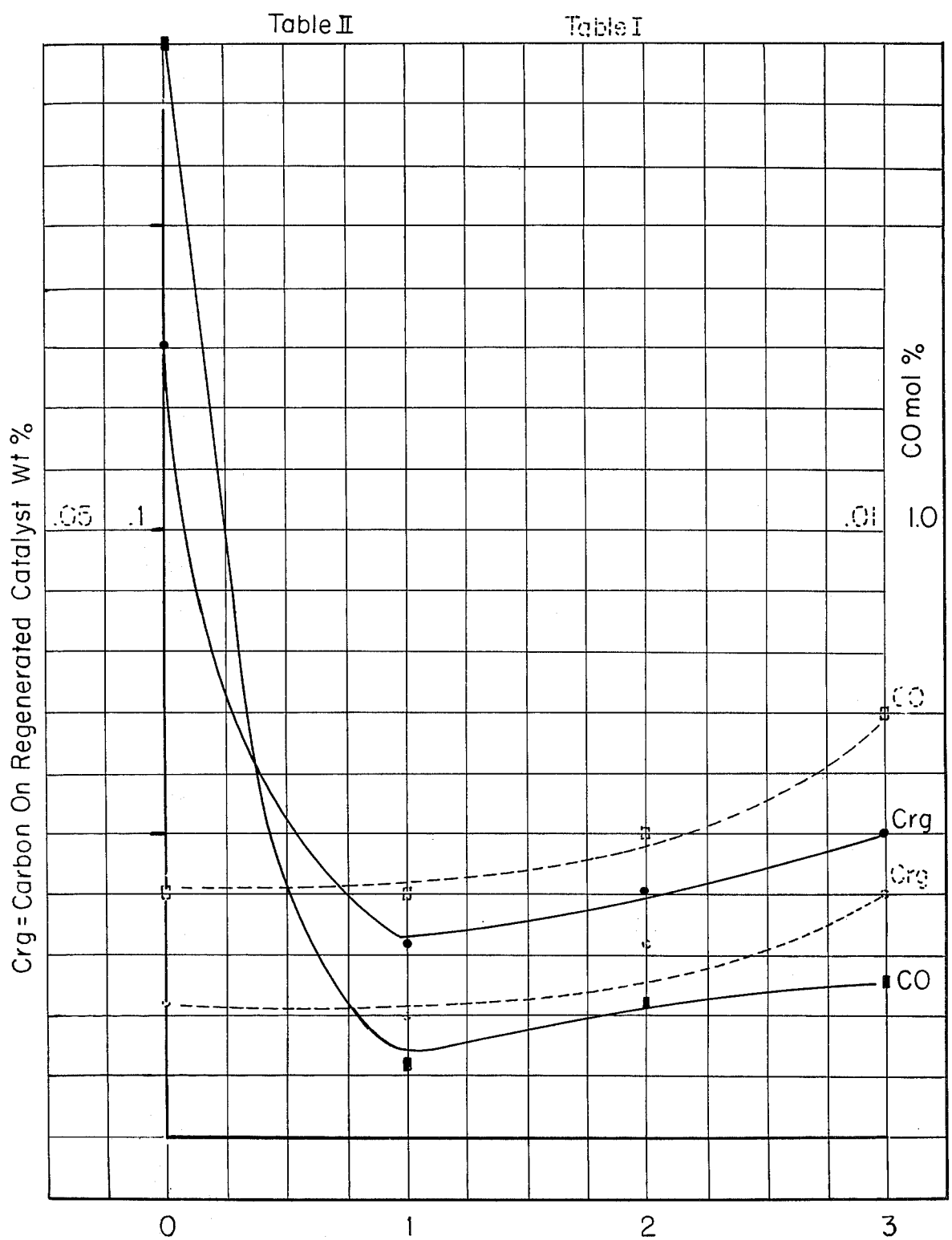

METHOD AND SYSTEM FOR REGENERATING FLUIDIZABLE CATALYST PARTICLES

BACKGROUND OF THE INVENTION

The field of catalytic cracking and particularly fluid catalyst operations have undergone significant development improvements due primarily to advances in catalyst technology and product distribution obtained therefrom. With the advent of high activity catalyst and particularly crystalline zeolite cracking catalysts new areas of operating technology have been encountered requiring even further refinements in processing techniques to take advantage of the high catalyst activity, selectivity and operating sensitivity. The present invention therefore is concerned with a combination operation comprising hydrocarbon conversion and regeneration of the catalyst employed therein. In a particular aspect the present invention is concerned with the technique of regenerating a hydrocarbon conversion catalyst containing deactivating deposits of carbonaceous material.

SUMMARY OF THE INVENTION

The present invention relates to the conversion of hydrocarbon feed materials in the presence of high activity fluidizable catalyst particles and the regeneration of the catalyst particles. In a more particular aspect the present invention is concerned with the method and system for regenerating fluidizable catalyst particles and particularly crystalline zeolite cracking catalyst under highly efficient regenerating conditions promoting the recovery of heat available through the burning of carbonaceous deposits of a hydrocarbon conversion operation. In yet another aspect, the invention is concerned with a particular relationship of operating parameters coupled in a manner promoting suspended catalyst phase removal of deactivating deposits of carbonaceous material from high activity hydrocarbon conversion catalyst particles and heating thereof to an elevated temperature.

In one aspect of the hydrocarbon conversion-catalyst regeneration system of the present invention, a dense fluid catalyst bed regeneration zone in open communication with an upflowing riser regeneration zone thereabove housing upflowing suspended catalyst particles is employed for effecting high temperature regeneration of catalyst particles which are then transferred in part to an adjacent riser hydrocarbon conversion zone wherein at a temperature of at least about 1,000° F., conversion of a hydrocarbon feed such as a gas oil feed with a cracking catalyst suspended therein is accomplished. The catalyst employed is preferably a crystalline zeolite high activity catalyst of fluidizable particle size which is transferred in suspended phase condition through the riser conversion zone for a hydrocarbon residence time in the range of 0.5 to about 10 seconds and more usually less than about 8 seconds before separating gasiform or vaporous hydrocarbon materials comprising hydrocarbon conversion products from suspended catalyst as by cyclonic separation means. During the hydrocarbon conversion step, carbonaceous deposits accumulate on the catalyst particles and the particles entrain hydrocarbon vapors from the catalyst separation step which are thereafter normally removed with stripping gas in a separate catalyst stripping zone. Hydrocarbon conversion products separated from catalyst and stripping gasiform materials are then combined and passed to a product fractionation step. Stripped catalyst containing deactivating amounts of carbonaceous material often referred to as coke is then passed to catalyst regeneration.

The regeneration technique and system of the present invention is unique in many respects for accomplishing the efficient removal of carbonaceous material or coke deposits on the catalyst particles and the recovery of heat available through such a coke removal operation. The regeneration technique of this invention relies upon a particular dense fluid bed operation superimposed by an upflowing dispersed, suspended catalyst phase operation of limited particle density and high temperature profile in which the density of catalyst particle in regeneration gas in the dense fluid catalyst bed is as high as 40 lbs/cu.ft. and the particles density in the upflowing dispersed catalyst phase is over a range decreasing down to about 8 lbs/cu.ft. and preferably to about 1.5 lbs/cu.ft. The regeneration gas velocity is preferably at least 3 ft./sec. to obtain desired dispersed phase catalyst flow through the regeneration. The high temperature profile of the suspended catalyst regeneration operation is initially promoted by the mixing of hot regenerated catalyst with the coke deactivated catalyst to provide an initial catalyst dense bed mix temperature of at least 1,175° F. and preferably about 1,200° F. so that upon initial contact with oxygen containing regeneration gas such as air combustion of carbonaceous deposits is rapidly promoted. Thus, in the system of the present invention all or part of the required amount of hot regenerated catalyst is mixed with coke deactivated catalyst in either the spent catalyst standpipe or bed of catalyst to provide a desired elevated mix temperature into the bottom portion of the riser regeneration zone housing the dense fluid bed of catalyst being regenerated from which the catalyst is moved upwardly suspended in regeneration gas. Additional hot regenerated catalyst may be added to the dense bed of catalyst by a separate standpipe arranged to discharge into a lower portion of the dense fluid bed of catalyst in the regeneration zone to provide the desired catalyst mix temperature of at least 1,175° to 1,200° F. in the event that only a portion thereof is added to the spent catalyst in the spent catalyst standpipe. On the other hand, mixing of coke contaminated catalyst and hot regenerated catalyst may first occur in a lower portion of the regeneration zone containing the most dense bed of fluidized catalyst particles before upflow therefrom suspended in oxygen containing gases. Provision is also made for adding supplemental oxygen containing regeneration gas to one or more upper portions of the riser regeneration zone to promote the conversion of CO to $CO_2$. In this arrangement, it has been found that a high particle density in the upflowing dispersed catalyst phase tends to quench the conversion of CO to $CO_2$ even at dispersed phase temperatures of at least 1,250° F. However, maintaining a low particle density in the suspended catalyst phase below about 5 lbs/cu.ft. permits a partial burn of the CO present which is thereafter completed in the enlarged settling section under lower catalyst particle density conditions.

The riser regeneration zone or regeneration vessel may take on substantially any shape, cylindrical, tapered or shaped as shown in the drawing or combination thereof which will provide the restricted operating parameters of the invention as herein defined.

The regenerating technique and system of this invention relies upon an initial high temperature dense fluid catalyst bed undergoing coke burning conditions accompanied by a dispersed catalyst phase withdrawal overhead therefrom wherein the conversion of formed CO to $CO_2$ is promoted and the recovery of heat thus generated is absorbed by catalyst particles dispersed therein so that the combustion gas-catalyst particle suspension discharged from the upper end of the suspended dispersed catalyst phase regeneration zone will have reached a temperature of at least about 1,350° F. In such a system the primary oxygen containing regeneration gas stream is introduced to the bottom portion of an enlarged bed of catalyst in the bottom of the regeneration zone and secondary regeneration gas is preferably introduced to an upper more restricted cross sectional area of the dispersed phase regeneration section as required in one or more downstream regeneration gas inlets to promote a more complete conversion of coke deposits and CO to $CO_2$. Preheating of the primary regenerated gas stream is desirable and more usually practiced with low coke producing catalyst conversion systems so that an initial catalyst mix temperature of at least 1,175° F. in the dense fluid bed of catalyst will be more easily attained.

The regenerating technique of the present invention relies upon a particular and considerably restricted relationship of operating parameters which will accomplish the removal of carbonaceous deposits down to at least 0.05 weight percent and preferably as low as about 0.03 weight percent in combination with limiting the amount of carbon monoxide in the combustion flue gases not to exceed about 0.15 mole percent. Thus it is essential to the processing concepts of this invention to initiate dense catalyst bed burning of deposited carbonaceous material at an elevated temperature of at least about 1,175° F. obtained by mixing spent catalyst with regenerated catalyst with an amount of oxygen containing regenerating gas providing a dense bed catalyst temperature rise of at least about 100° and preferably sufficient to heat the catalyst particles carried overhead from the bed of catalyst to an elevated temperature of at least 1,300° F. Furthermore, to reap the advantage of the heat generated in the system, the regeneration gas flow rate is restricted to maintain a density of catalyst particles in the bottom portion of the regeneration zone within the range of 35 to 40 lbs/cu.ft. and in the upper more dispersed catalyst phase region of the suspended catalyst regeneration zone adjacent the discharge therefrom at a density of catalyst particles as low as about 5 lbs/cu.ft. and preferably not above about 3 lbs/cu.ft.

It will be recognized from the above discussion that a delicate balance in operating parameters must be maintained to obtain a desired coke burning and removal thereof without producing undesired oxygen and carbon monoxide concentrations in the combustion flue gases and these operating restrictions are dictated in substantial measure by the ratio of hot regenerated catalyst that can be mixed with spent catalyst obtained from hydrocarbon conversion. Thus it will be observed from the data presented herein and shown in FIG. II, that too high a mix ratio is undesirable for producing regenerated catalyst particles at a temperature of about 1,400° because of insufficient coke burning and too low a mix ratio does not accomplish the desired coke burn and removal within the limits of the system. Low initial catalyst mix temperatures or much greater than 1 to 1 regenerated catalyst to spent catalyst mix ratios are accompanied by high concentrations of carbon monoxide and oxygen in the combustion flue gases it has been observed.

BRIEF DESCRIPTION OF THE DRAWINGS

FIG. I presents diagrammatically in elevation one arrangement of apparatus for accomplishing the riser catalytic conversion of hydrocarbons and the regeneration of catalyst particles initially with a mixture of regeneration and spent catalyst in a dense fluid bed of catalyst followed by a dispersed catalyst regeneration phase before separation of flue gases from regenerated catalyst particles of desired CO content.

FIG. II is a plot of the data presented in Tables I and II.

DISCUSSION OF SPECIFIC EMBODIMENT

Referring now to the drawing, FIG. I, a hydrocarbon feed such as a gas oil boiling range feed is introduced by conduit 2 to the bottom of a riser conversion zone 4. Hot regenerated catalyst in conduit 6 provided with flow control valve 8 enters the bottom portion of riser 4 for admixture with the oil feed to form a catalyst-oil suspension at an elevated conversion temperature of at least about 950° F. and more usually at least 1,000° F. The suspension is passed upwardly through the riser conversion zone under hydrocarbon conversion conditions promoting the cracking of the gas oil feed to produce carbonaceous deposits on the catalyst products and lower boiling products including gasoline, fuel oils and normally gaseous hydrocarbon products. The hydrocarbon feed with suspended catalyst particles is usually maintained in the riser conversion zone for a hydrocarbon residence time in the range of 4 to 10 seconds, however shorter hydrocarbon residence time in the range of 0.5 to 4 seconds may also be employed particularly when using hydrocarbon conversion temperatures up to about 1,100° F. The suspension is discharged from the upper open end of the riser conversion zone against a deflector baffle 10 as shown or it may be passed directly into cyclonic separation means about the end of the riser reactor. In the arrangement of the drawing the suspension discharged from the riser is deflected outwardly into an enlarged separation zone 12 causing a drop in the suspension velocity which promotes the separation of catalyst particles by settling from gasiform material comprising hydrocarbon conversion products. Hydrocarbon vapors or gasiform material with a reduced amount of suspended catalyst particles pass into separators 14 and 16 wherein cyclonic separation of entrained catalyst particles from gasiform hydrocarbon product material is accomplished. Of course cyclone separators 14 and 16 may each be a plurality of cyclonic separation means suitably connected to accomplish the results desired. Gasiform hydrocarbon material and stripping gas obtained as provided below is withdrawn by conduits 18 and 20 communicating with plenum chamber 22 and withdrawal conduit 24. Conduit 24 communicates with product separation equipment not shown. Catalyst particles separated by the velocity reduction above discussed and by cyclonic means is collected as a bed of catalyst 26 which moves downwardly through a stripping vessel and countercurrent to rising stripping gas such as steam introduced by conduit 28. The stripping gas maintains the bed of catalyst 26 in a fluid condition and removes entrained hydrocarbon vapors and other strippable material from the catalyst as it moves downwardly through the stripping zone. Stripped catalyst is withdrawn by standpipe 30 provided with flow control valve 32 and passed to the bottom portion of a regeneration zone 34 shown to be bulb-shaped in the drawing and housing a dense fluid bed of catalyst to be regenerated as herein provided. Regenerated catalyst obtained as hereinafter defined and withdrawn by standpipe 36 provided with flow control valve 38 communicates with standpipe or conduit 30 and permits the mixing of hot regenerated catalyst at a temperature of at least 1,300° F. with the spent catalyst in conduit 30 at a temperature in the range of about 900° F. up to about 960° F.

In the enlarged bulb portion of the regenerator a dense bed of catalyst comprising a mixture of coke contaminated catalyst and hot freshly regenerated catalyst particles passed and obtained through the regeneration sequence of this invention are mixed to provide a catalyst bed temperature of at least about 1,175° F. Additional regenerated catalyst may be added by standpipe 40 provided with flow control valve 42 to the enlarged bulb portion 34 of the regenerator to assist with providing a desired mix temperature. In the bottom bulb portion of the regenerator, a relatively large dense fluid bed of catalyst particles is formed providing a mixture temperature of at least 1,175° F. and a density of catalyst particles within the range of 35 to 40 lb/cu.ft. A regeneration gas distributor grid is provided in the bottom portion of the dense fluid catalyst bed to which the primary regeneration gas stream is fed by conduit 44. Heating of the regeneration gas or air stream introduced by conduit 44 is preferred in view of the delicate balance in operating parameters required by the invention. Thus with a spent catalyst temperature of about 960° F. and containing 0.9 wt.% carbon thereon, it is desirable to preheat the regeneration gas to about 325° F. and use a 1 to 1 ratio of spent catalyst to recycle regenerated catalyst at a temperature of about 1,400° F. In the dense fluid bed of catalyst particles, the temperature of the bed is caused to be elevated by the burning of carbonaceous material with introduced oxygen containing regeneration gas. Furthermore, combustion of carbonaceous material is rapidly initiated by the hot catalyst mix so that catalyst particles carried overhead by hot oxygen containing combustion gases will complete the removal of carbonaceous deposits, transform carbon monoxide to carbon dioxide and produce a less dense catalyst combustion gas suspension temperature of at least 1,350° F. and preferably at least about 1,390° F. As mentioned above, the density of particles in the upwardly flowing suspension is decreased in the direction of flow to at least 5 lbs/cu.ft. and preferably it is reduced to 3 lbs/cu.ft. before discharge from the riser into the enlarged separation zone. In any event the suspended catalyst phase in the enlarged settling zone will be less than 3 lbs/cu.ft.

The regenerated catalyst suspension is discharged from the open upper end of riser regenerator 46 extending above bulb portion 34. Additional oxygen containing gas such as air may be added by one or more spaced inlets represented by conduit 48 to downstream portions of suspended catalyst phase regeneration zone. The catalyst-combustion gas suspension passed upwardly through the restricted cross-sectional regeneration zone or riser 46 discharges against baffle 50 which deflects the suspension outwardly into an enlarged settling zone 52 thereby substantially lowering the velocity of the suspension and causing the catalyst particles to settle out. In settling zone 52 a major portion of the catalyst particles separates from the combustion flue gases by a reduction in gas velocity before the flue gases pass through a plurality of cyclone separators represented by separators 54 and 56. Combustion flue gases are removed from separators 54 and 56 by conduits 48 and 60, plenum chamber 62 and withdrawal conduit 64.

Catalyst particles separated as above identified are collected as an annular dense fluid bed of catalyst 66 about the upper end of riser 46 at an elevated temperature up to about 1,400° F. from which regenerated catalyst is withdrawn by standpipes 67, 36 and 40 as herein discussed.

The catalyst regeneration method and system of the present invention is unique over that of the known prior art by the limited mixing of hot regenerated catalyst without cooling thereof with coke contaminated catalyst in an amount sufficient to provide an elevated mix temperature of at least 1,175° F. This high mix temperature is sufficient for promoting the combustion of carbonaceous deposits and the conversion of formed carbon monoxide to carbon dioxide on a once through basis in a suspended catalyst atmosphere varying in particle density from about 40 lb/cu.ft. down to about 3 lbs/cu.ft. and less.

The catalyst regeneration technique of the present invention particularly relies upon the relatively narrow limits of mix ratios comprising hot regenerated catalyst at a temperature of at least 1,350° F. mixed with spent catalyst to obtain a catalyst mixture of at least 1,175° F. and the mixture thus formed comprising sufficient carbonaceous material deposits to raise the temperature of the catalyst mixture through combustion up to at least 1,350° F. by burning when contacted with oxygen containing regeneration gases. Elevating the temperature of the regenerated catalyst up to 1,380° and 1,400° F. is particularly preferred.

The essence of the catalyst regeneration concept and method of operation above described was confirmed by analysis of commercial data and a series of calculations based on the conditions presented below.

| A fixed piece of equipment - adiabatic in operation | |
|---|---|
| Dense phase volume | : 5,600 cu. ft. |
| Dilute phase volume | : 14,000 cu. ft. |
| Spent Catalyst | |
| Circulation | : 60 tons/minute |
| Carbon Content | : 0.90 wt. % |
| Catalyst Inlet Temperature | : 960° F |
| Total Hold Up | : 120 tons (80% in dense bed, 20% in riser) |

Catalyst Residence time in the dense catalyst bed and riser: 2 minutes (with no recycle)

| Regenerator Air | |
|---|---|
| Low Rate | : 906,000 lb/hr |
| High Rate | : 1,120,000 lb/hr |
| Inlet Air Temperature | : 325° F. |

The calculations made assume uniform mixing of catalyst particles and a slow carbon burning rate proportional to the average concentration of carbon on the catalyst in the dense bed. The burning of CO to $CO_2$ proceeds at a slow rate in the dense fluidized bed. The rate of this reaction is much higher in the gas phase in the absence of catalyst. The calculations were made with two assumptions for the rate of CO reaction in the riser:

1. the homogeneous gas phase rate,
2. a rate 10% of the homogeneous gas phase rate.

For rapid, homogeneous carbon monoxide burning in the gas phase the temperature must be above 1,250° F.

One series of calculations not provided herein was made with a low air rate. This was operable with undesired residual coke on regenerated catalyst and high CO in the flue gas and as soon as regenerated catalyst recycle was practiced, temperatures rose, carbon burned increased, but the CO content of the flue gas also increased beyond desired limits because of insufficient air, and also the flue gas contained zero oxygen. This type operation is considered undesirable because of the high concentration of CO in the flue gases.

A more meaningful operation supplies enough oxygen to burn the carbon to $CO_2$. Table I below reports the data obtained assuming homogeneous CO burning in the riser and high air rates.

TABLE I (High Air Rate - Homogeneous CO Burning in Riser)

| Re-cycle Ratio | Temperature, °F. | | | | | Carbon on Regen. Cat., wt.% | Gas Out, mol.% | |
|---|---|---|---|---|---|---|---|---|
| | Cat Mix to Regenerator | Top of Dense Bed | Top of Riser | Top Dense Bed | Top Riser | | CO | $O_2$ |
| 0 | 960 | 1172 | 1404 | 0.21 | 0.011 | | .004 | 2.42 |
| 1.0 | 1180 | 1291 | 1400 | 0.06 | 0.01 | | 0.004 | 2.7 |
| 2.0 | 1243 | 1321 | 1393 | 0.044 | 0.016 | | 0.005 | 2.4 |
| 3.0 | 1271 | 1330 | 1383 | 0.040 | 0.020 | | .007 | 2.47 |

Table II below is yet a further variation in which a high air was used and the CO burning rate was assumed to be only 10% of the homogeneous CO burning rate.

In this series 30% of the spent catalyst mixed with catalyst carried overhead from the dense bed and thereafter rose through the riser. 70% was mixed with regenerated catalyst in the dense bed.

TABLE II (High Air Rate, CO burning rate 10% of homogeneous)

| Re-cycle Ratio | Temperature, °F. | | | Carbon on Regen. Cat., wt.% | | Gas Out. mol.% | |
|---|---|---|---|---|---|---|---|
| | Cat. Mix to Regenerator | Top of Dense Bed | Top of Riser | Top Dense Bed | Top Riser | CO | $O_2$ |
| 0 | 960 | 1129 | 1323 | 0.221 | 0.131 | 1.81 | 5.0 |
| 1 | 1222 | 1298 | 1410 | 0.037 | 0.032 | 0.12 | 2.2 |
| 2 | 1252 | 1301 | 1360 | 0.036 | 0.04 | 0.22 | 3.1 |
| 3 | 1269 | 1305 | 1350 | 0.34 | 0.049 | 0.25 | 3.48 |

It will be observed from the above data and the plot of FIG. II that the lowest coke level on regenerated catalyst is obtained at a recycle ratio of 1 and that the corresponding CO level at the top of the riser is low enough to avoid significant afterburning.

Review of the data and FIG. II indicate that the following operating parameters are desirable:

A regenerated catalyst recycle ratio of 0.5 to 2.0 and preferably 0.8 to 1.5 is preferable.

A dense catalyst bed outlet regeneration temperature above 1,250° F. is particularly desirable and a temperature of 1,280° F. is even more preferable.

The catalyst discharged from the riser should be at least 1,350° F.

Residual carbon on regenerated catalyst < 0.05%.

CO content of flue gas out of riser less than 0.2 mole percent, and preferably less than 0.1 mol percent.

The data above presented and presented in FIG. II shows that the recycle ratio of regenerated catalyst to spent catalyst passed through an optimum at about 1.

To limit quenching the conversion of CO to $CO_2$ with regenerated catalyst particles in the riser, the suspension temperature should be at least 1,300° F. and the catalyst particles density in the combustion flue gas should be less than 5 lbs/cu.ft. and preferably less than 3 lbs/cu.ft.

We claim:

1. In a process for converting hydrocarbons in the presence of fluidized catalyst particles followed by stripping of the catalyst particles to remove entrained hydrocarbonaceous material prior to regeneration of the catalyst particles to remove deposited carbonaceous material by burning thereby heating the catalyst particles to an elevated temperature the improvement which comprises combining hot freshly regenerated catalyst particles with deactivated catalyst particles comprising carbonaceous material in a mixing zone prior to discharge into a dense fluid bed of catalyst particles, passing a second stream of hot regenerated catalyst particles separately and directly to said dense fluid bed in an amount providing a dense bed temperature of at least 1,175° F and a ratio of regenerated catalyst particles to deactivated catalyst particles within the range of 0.5 to 1.5/1, introducing pre-heated oxygen containing gas to the lower portion of said dense fluid catalyst bed in an amount promoting the combustion of carbonaceous material and entrainment of particles of catalyst in combustion flue gases overhead into an upflowing dispersed catalyst phase, maintaining a ratio of oxygen containing regeneration gas with entrained catalyst particles in said dispersed catalyst phase sufficient to promote combustion of combustible material and provide regenerated catalyst particles at a temperature of at least 1,350° F, and recovering regenerated catalyst particles from said dispersed catalyst phase for recycle and use as above recited and for passage to said hydrocarbon conversion operation.

2. A method for regenerating catalyst particles containing deactivating amounts of carbonaceous material which comprises mixing a first stream of regenerated catalyst particles at a temperature above 1,300° F with a stream of deactivated catalyst particles containing carbonaceous material before discharge thereof into a dense fluid bed of catalyst particles at an elevated temperature, passing a second stream of regenerated catalyst particles at a temperature above 1,300° F separately to said dense fluid bed of catalyst in an amount sufficient to maintain said dense fluid bed of catalyst and its temperature above about 1,175° F, contacting said dense fluid bed of catalyst at said elevated temperature with an oxygen containing regeneration gas under conditions to burn combustible material at velocity conditions sufficient to entrain catalyst particles from said dense catalyst bed phase into an upflowing dispersed catalyst phase there above, recovering a flue gase product of combustion and catalyst particles heated to a temperature of at least 1,350° F separately from the upper end of said upflowing dispersed phase of catalyst and recycling hot regenerated catalyst recovered from said dispersed phase as separate streams for use as above recited.

3. The method of claim 2 wherein the concentration of catalyst particles in said relatively dense catalyst phase and said less dense dispersed catalyst phase varies from about 40 lbs/cu.ft. down to at least 5 lbs/cu.ft.

4. The method of claim 2 wherein the concentration of the catalyst particles in the flue gas discharged from the dispersed catalyst phase regeneration is not above about 3 lbs/cu.ft.

5. The method of claim 2 wherein a dispersed catalyst phase flue-gas mixture is passed from a dispersed catalyst-phase regeneration zone into a catalyst separation and collection zone and flue gases separated from catalyst therein contain not more than 0.20 mole percent CO.

6. The method of claim 2 wherein the catalyst comprises a crystalline zeolite and the temperature of the catalyst passing into the dispersed phase is at least 1,250° F.

7. The method of claim 2 wherein the ratio of regenerated catalyst to spent catalyst in said dense fluid bed is at least 0.8/1.

8. The method of claim 2 wherein the density of particles in the entraining flue gas in the upflowing dispersed phase is less than 5 lbs. per cubic foot.

* * * * *